United States Patent
Chen et al.

(10) Patent No.: US 7,782,178 B2
(45) Date of Patent: Aug. 24, 2010

(54) VEHICLE ANTI-THEFT SYSTEM AND METHOD

(75) Inventors: Kuo-Rong Chen, Banciao (TW); Chun-Chung Lee, Taipei (TW); Ming-Wen Yang, Sinjhuang (TW)

(73) Assignee: Sin Etke Technology Co., Ltd., Taipei (TW)

( * ) Notice: Subject to any disclaimer, the term of this patent is extended or adjusted under 35 U.S.C. 154(b) by 331 days.

(21) Appl. No.: 12/155,030

(22) Filed: May 29, 2008

(65) Prior Publication Data

US 2009/0189750 A1    Jul. 30, 2009

(30) Foreign Application Priority Data

Jan. 29, 2008    (TW) ............................... 97103358 A

(51) Int. Cl.
  *B60R 25/10* (2006.01)
(52) U.S. Cl. .............................. 340/426.1; 340/426.11; 340/426.13; 340/426.34; 340/425.5; 340/568.1; 340/539.13; 307/10.2
(58) Field of Classification Search .............. 340/426.1, 340/426.11, 426.12, 426.13, 426.34, 425.5, 340/568.1, 463, 438, 539.1, 539.16, 539.18, 340/539.19, 539.13, 5.73, 5.22, 5.54; 307/10.2–10.5; 180/270, 167; 701/1, 2, 32
See application file for complete search history.

(56) References Cited

U.S. PATENT DOCUMENTS

| | | | |
|---|---|---|---|
| 6,927,676 B2* | 8/2005 | Edens et al. ............. | 340/426.1 |
| 7,027,919 B2* | 4/2006 | Bernesi et al. ............. | 701/220 |
| 2006/0103529 A1* | 5/2006 | Ohmura et al. .......... | 340/568.1 |

\* cited by examiner

*Primary Examiner*—Anh V La
(74) *Attorney, Agent, or Firm*—Bacon & Thomas, PLLC

(57) ABSTRACT

In a vehicle anti-theft system, a vehicle-mounted mainframe downloads a sole identification code, serving as a control identification code, and transfers the sole identification code into a part as a part identification code. The vehicle-mounted mainframe determines if the control identification code is obtained when the vehicle is activated. If yes, the vehicle-mounted mainframe sends a request command to the part to obtain the part identification code. The vehicle-mounted mainframe determines if the part identification code meets with the control identification code. If yes, the vehicle-mounted mainframe produces a normal operation signal to enter a normal operational mode and feedbacks the identification code to the customer service center. The customer service center checks with a database for stolen events. If an event of vehicle stolen is found, subsequent procedures are taken; otherwise, the vehicle-mounted mainframe transfers an abnormal signal to the customer service center for proceeding with subsequent procedures.

16 Claims, 3 Drawing Sheets

VEHICLE ANTI-THEFT SYSTEM AND METHOD

BACKGROUND OF THE INVENTION

1. Field of the Invention

The invention relates to the technical field of anti-theft and, more particularly, to a vehicle anti-theft system and method.

2. Description of Related Art

The existing vehicle anti-theft system on a vehicle generally comprises a vehicle-used battery, a buzzer and an anti-theft mainframe, in which the anti-theft mainframe is electrically connected with a plurality of sensors. The vehicle-used battery is connected respectively to the buzzer and the anti-theft mainframe for providing electrical power thereto. In a normal anti-theft mode, if one of the sensors produces a sensing signal due to an abnormal condition (for example, a vehicle is towed away and a vibration sensor will sense existing severe vibration of the vehicle), the sensed signal will be transmitted to the anti-theft mainframe such that the anti-theft mainframe initiates the buzzer to generate alarm sound and triggers vehicle lamps to flicker.

In addition, a GPS satellite positioning system and a mobile communication device are further provided for tracking out the existing position of a stolen vehicle according to GPS positioning signals.

However, if a vehicle-used component/accessory, such as a DVD, a navigation system, etc., is stolen, there is no effective way to track and recover the stolen component/accessory. Focusing on such a problem, in a known vehicle anti-theft system, each of the parts to be verified is stored with an individual verification code. After power-on of the vehicle anti-theft system, the individual verification code stored on each of the parts to be verified is read for proceeding with comparison. If the result of comparison shows consistency, the engine of the vehicle is allowed to activate. Otherwise, the vehicle is not allowed to activate. However, if any component/accessory is stolen, unexpectedly it will embarrass the vehicle owner for not being able to start the vehicle, while the stolen component/accessory cannot be tracked and recovered. In addition, since each of the parts to be verified is provided with a sole individual verification code, the vehicle anti-theft system has to provide a storage medium with bigger capacity for storing the verification codes as the number of the vehicle-used parts is increasing. Further, as a part is stolen, it cannot be tracked through the verification code as to which vehicle the part belongs. Meanwhile, as a vehicle adds a new equipment, such as a vehicle-mounted video and audio playing system, the vehicle has to be returned back to a field of maintenance for installation because the new equipment does not provide with a verification code, causing inconvenience to the vehicle driver. There are many drawbacks existing in the conventional vehicle anti-theft systems which need to be overcome.

SUMMARY OF THE INVENTION

An objective of the invention is to provide a vehicle anti-theft system and method capable of lowering the probability of a vehicle/vehicle-used part being stolen and earlier finding and effectively tracking the running of the stolen vehicle/vehicle-used part in case an event of being stolen occurs.

A further objective of the invention is to provide a vehicle anti-theft system and method capable of easily adding a part in a vehicle without the need of going back to the field of maintenance, thereby increasing convenience in usage.

A feature of the invention is to provide a vehicle anti-theft system, including a customer service center, a vehicle-mounted mainframe, a transmission bus and at least a part. The customer service center includes a mainframe, providing a built-in vehicle identification database and a built-in database for stolen events, and a first transceiver device, in which the customer service center transfers a sole identification code through the mainframe and the first transceiver device via a radio channel. The vehicle-mounted mainframe is installed on a vehicle and includes a second transceiver device, a first memory and a GPS positioning module, in which the vehicle-mounted mainframe receives the sole identification code through the second transceiver device and stores the code into the first memory. The transmission bus is connected to the vehicle-mounted mainframe. The at least a part has a second memory connected to the transmission bus. Among which, the vehicle-mounted mainframe transfers the sole identification code to the at least a part through the transmission bus and the at least a part stores the sole identification code into the second memory for subsequent inspection by the vehicle-mounted mainframe.

A further feature of the invention is to provide a vehicle anti-theft method, in which a vehicle-mounted mainframe downloads from a customer service center a sole identification code, serving as a control identification code, and transfers and stores the sole identification code into at least a part as a part identification code. The vehicle-mounted mainframe and the at least a part are installed in a vehicle and are interconnected with each other through a transmission bus. The method comprises the following steps: (A) the vehicle-mounted mainframe determining if the control identification code is obtained as the vehicle is activated; (B) sending a request command to the at least a part as the vehicle-mounted mainframe determines that the control identification code is obtained; (C) the at least a part determining if the format of the request command is correct; (D) the at least a part determining if a part identification code is provided thereon as the format of the request command is determined correct; (E) transmitting the part identification code to the vehicle-mounted mainframe as the at least a part determines that the part identification code is provided thereon; (F) the vehicle-mounted mainframe determining if the part identification code transmitted by the at least a part meets with the control identification code pre-stored in the vehicle-mounted mainframe; and (G) as the vehicle-mounted mainframe determines that the part identification code transmitted by the at least a part meets with the control identification code pre-stored in the vehicle-mounted mainframe, the vehicle-mounted mainframe entering into a normal operational mode and transmitting the identification code to the customer service center.

DETAILED DESCRIPTION OF THE PREFERRED EMBODIMENT

The implementation of the invention will be interpreted by the following particular embodiments such that people in the art having common sense will easily understand the advantages and effects of the invention according to the disclosure of the invention.

Figure 1:
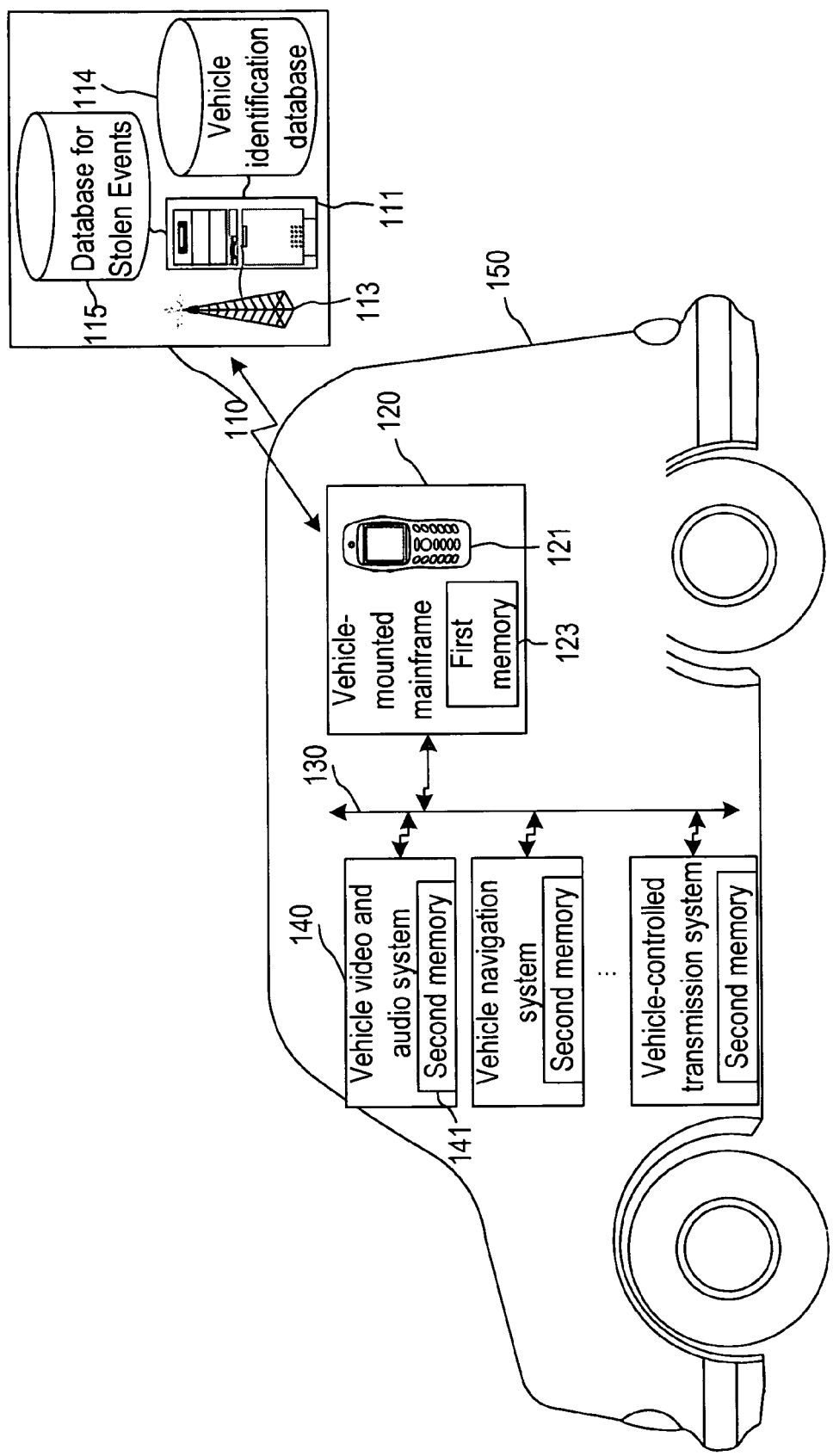
FIG. 1 is a schematic diagram showing a vehicle anti-theft system of the invention.

FIG. 1 is a schematic diagram showing a vehicle anti-theft system of the invention. The vehicle anti-theft system of the invention comprises a customer service center (110), a vehicle-mounted mainframe (120), a transmission bus (130) and at least a part (140).

The customer service center (110) includes a vehicle identification database (114), a database for stolen events (115), a mainframe (111) and a first transceiver device (113), in which the customer service center (110) transfers a sole identification code through the mainframe (111) and the first transceiver device (113) via a radio channel.

The vehicle-mounted mainframe (120) is installed on a vehicle (150) and includes a second transceiver device (121) and a first memory (123), in which the vehicle-mounted mainframe (120) receives the sole identification code through the second transceiver device (121) and stores the code into the first memory (123) as a control identification code.

The second transceiver device (121) is one of the following: a GSM transceiver device, a GPRS transceiver device, a WCDMA transceiver device, a CDMA 2000 transceiver device and a WiMax transceiver device. The first transceiver device (113) is a corresponding base station of the second transceiver device (121).

The transmission bus (130) is connected to the vehicle-mounted mainframe (120). The transmission bus (130) is one of the following: a CAN interface bus, an LIN interface bus, an SPI interface bus and an I2C interface bus.

The at least a part (140) has a second memory (141) and is connected to the transmission bus (130). The vehicle-mounted mainframe (120) transfers the sole identification code to the at least a part (140) via the transmission bus (130) and the at least a part (140) stores the sole identification code into the second memory (141), serving as a part identification code, for subsequent inspection by the vehicle-mounted mainframe (120).

The at least a part (140) is one of the following: a vehicle-controlled transmission system, a vehicle air conditioning system, a vehicle battery system, a vehicle meter panel system, a vehicle navigation system and a vehicle video and audio system.

As the vehicle-mounted mainframe (120) determines that the part identification code is different from the control identification code, it sends through the second transceiver device (121) an abnormal signal and the part identification code to the customer service center (110). The customer service center (110) checks the database for stolen events (115) to see if the part identification code exists. If yes, it indicates that the part is stolen. The customer service center (110) calculates and tracks the current running route of the vehicle using a base station (i.e. the first transceiver device 113) signal sent back by the vehicle-mounted mainframe, thereby tracking the flow of the stolen part. In addition, the vehicle-mounted mainframe (120) may further include a GPS satellite positioning device (not shown in the drawing). As the part identification code exists in the database for stolen events (115), the vehicle-mounted mainframe (120) sends via the second transceiver device (121) a GPS position signal of the vehicle to the customer service center (110) to track the flow of the stolen goods.

Figure 2:
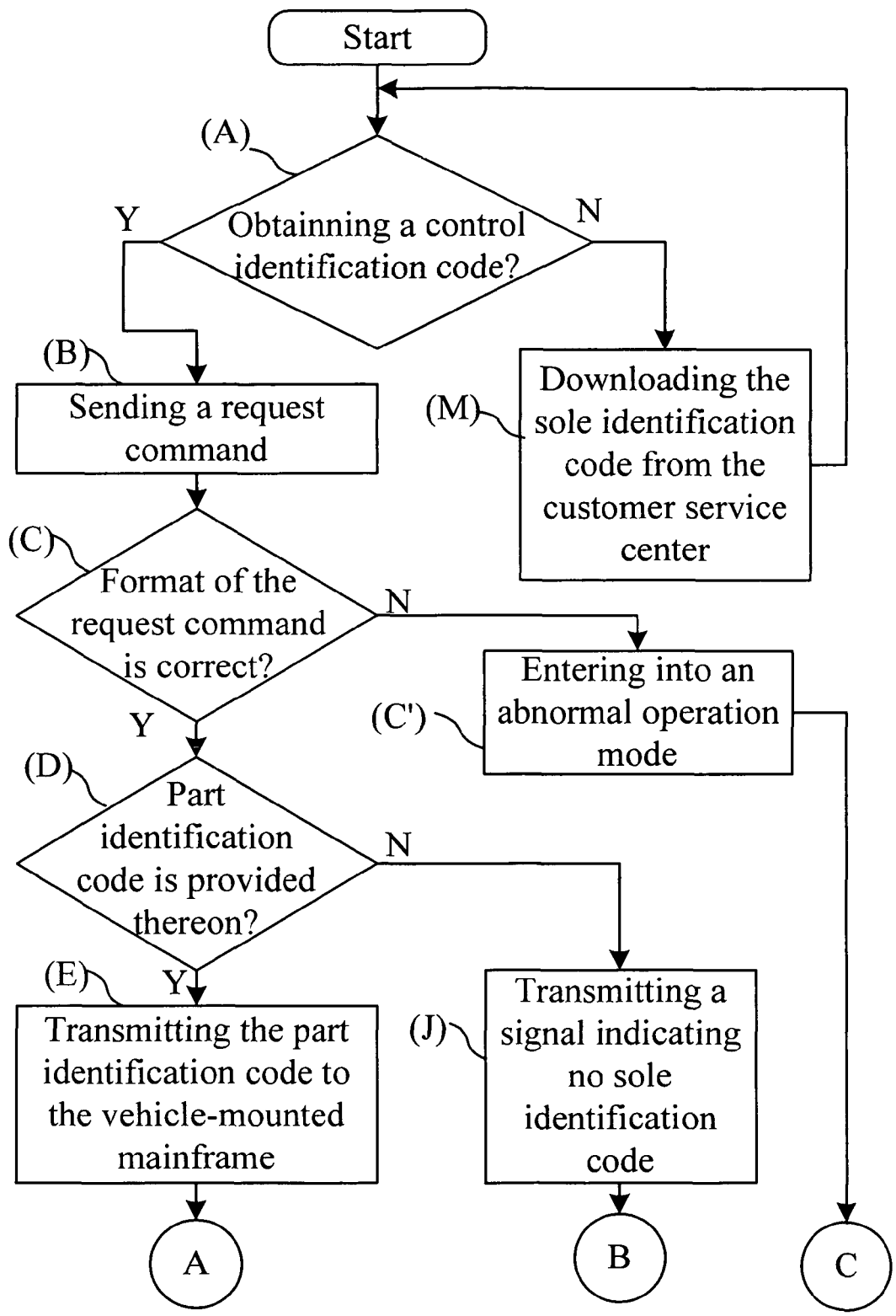
FIGS. 2 and 3 show a flow chart of a vehicle anti-theft method of the invention.
Figure 3:
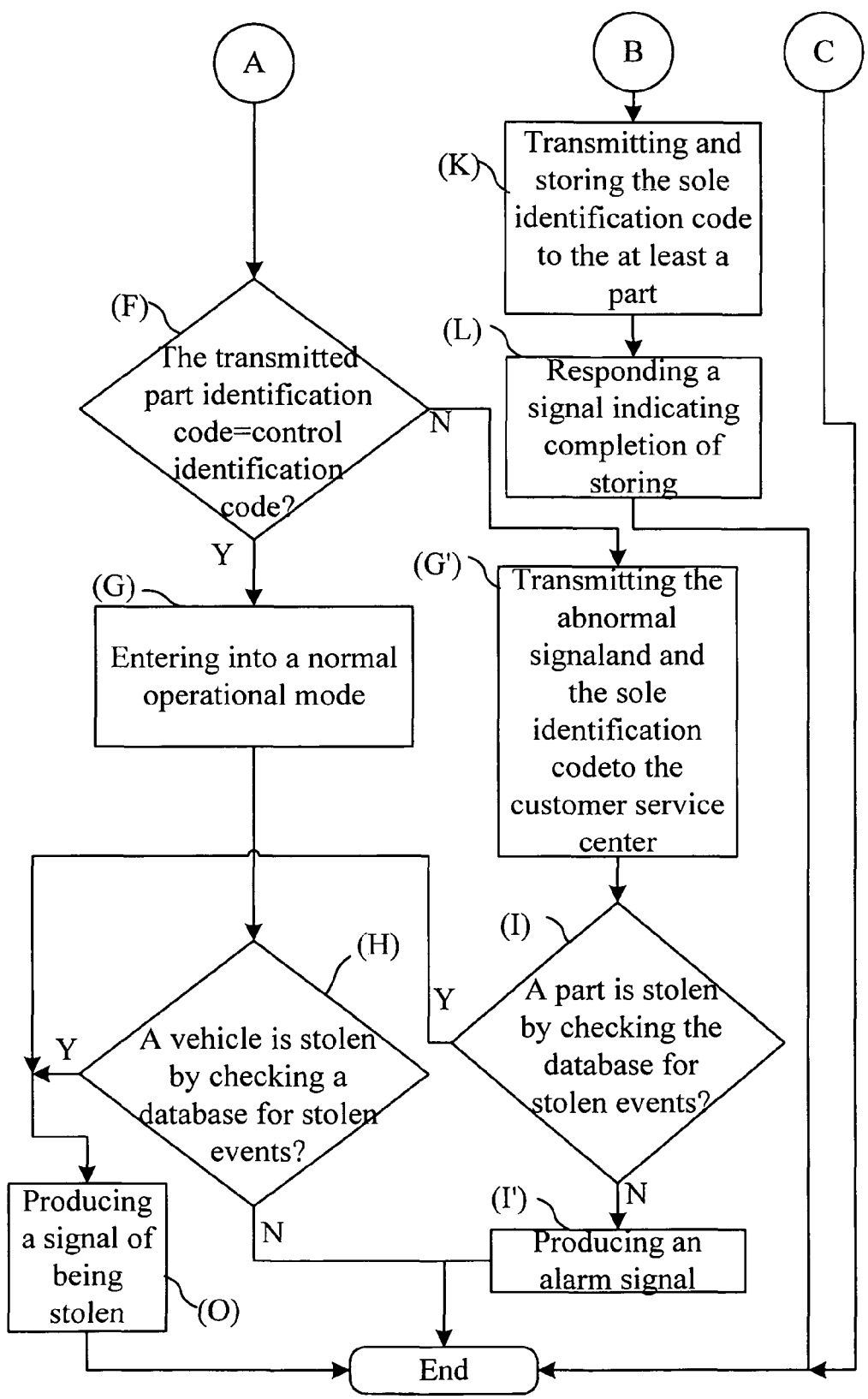

FIGS. 2 and 3 show a flow chart of a vehicle anti-theft method of the invention. In the method, the vehicle-mounted mainframe (120) downloads from the customer service center (110) a sole identification code, serving as a control identification code, and transmits and stores the sole identification code into the at least a part (140) as a part identification code. The vehicle-mounted mainframe (120) and the at least a part (140) are installed in the vehicle (150) and are interconnected with each other through the transmission bus (130). First, in step (A), the vehicle-mounted mainframe (120) determines if the control identification code is obtained as the vehicle is activated. It is determined by checking if there exists a control identification code in the first memory (123) of the vehicle-mounted mainframe (120). As data in the first memory (123) is a particular type of data of 0xFFFFFFFF, 0x00000000 or 0x55aa55aa, the vehicle-mounted mainframe (120) determines not obtaining the control identification code. As data in the first memory (123) is not a particular type of the data of 0xFFFFFFFF, 0x00000000 or 0x55aa55aa, the vehicle-mounted mainframe (120) determines obtaining the control identification code.

In step (B), a request command is sent to the at least a part (140) as the vehicle-mounted mainframe (120) determines that the control identification code is obtained.

In step (C), the at least a part (140) determines if the format of the request command is correct.

In step (D), the at least a part (140) determines if a part identification code is provided thereon as the format of the request command is determined correct. It is determined by checking if there exists a part identification code in the second memory (141) of the at least a part (140). As data in the second memory (141) is a particular type of data of 0xFFFFFFFF, 0x00000000 or 0x55aa55aa, the at least a part (140) determines not existing the part identification code. As data in the second memory (141) is not a particular type of the data of 0xFFFFFFFF, 0x00000000 or 0x55aa55aa, the at least a part (140) determines existence of the part identification code.

In step (E), the part identification code is transmitted back to the vehicle-mounted mainframe (120) as the at least a part (140) determines that the part identification code is provided thereon.

In step (F), the vehicle-mounted mainframe (120) determines if the part identification code meets with the control identification code pre-stored in the vehicle-mounted mainframe (120).

In step (G), as the vehicle-mounted mainframe (120) determines that the part identification code meets with the control identification code pre-stored in the vehicle-mounted mainframe (120), the vehicle-mounted mainframe enters into a normal operation mode and transmits the identification code to the customer service center (110). If not, in step (G'), the vehicle-mounted mainframe (120) produces an abnormal signal and transmits the abnormal signal and the control identification code to the customer service center (110).

In step (H), the customer service center (110) verifies by checking the database for stolen events (115) if a vehicle is stolen. If not, further proceeding is ended. If yes, step (O) is executed.

In step (O), the customer service center (110) produces a signal of being stolen, and calculates and tracks the current running route of the vehicle using a base station (113) signal/ GPS signal sent back by the vehicle-mounted mainframe (120), thereby tracking the vehicle. The customer service center (110) reports to the police for notifying a stolen event.

In step (I), the customer service center (110) verifies if a part is stolen by checking the database for stolen events (115). If not, step (I') is executed. If yes, the step (O) is executed.

In the step (I'), the customer service center (110) produces an alarm signal based on the abnormal signal and the part identification code of the at least a part (140).

In step (J), a signal indicating not existing the part identification code is transmitted to the vehicle-mounted mainframe (120) when the at least a part (140) determines in the step (D) that the part identification code is not provided thereon.

In step (K), the vehicle-mounted mainframe (120) transmits and stores the control identification code pre-stored thereon to the at least a part (140) to serve as a part identification code.

In step (L), after completion of storing, the at least a part (140) responds a signal indicating completion of storing, and a normal operation mode is entered. Thus, the driver may newly add a part (140) in the vehicle easily without the need of returning to the field for maintenance so as to increase convenience of the driver in usage.

In step (C'), as the at least a part (140) determines in the step (C) that the format of the request command is incorrect, the at least a part (140) enters into an abnormal operation mode. In the abnormal operation mode, the at least a part (140) does not execute its available function so as to avoid the situation of separating the at least a part (140) for selling as the vehicle (150) is stolen and disassembled, thereby lowering the probability of the vehicle (150) being stolen.

In step (M), as the vehicle-mounted mainframe (120) determines in the step (A) not obtaining the sole identification code, the vehicle-mounted mainframe (120) transfers a download identification code signal to the customer service center (110) and in the vehicle identification database (114) of the customer service center, a comparison between the download identification code signal and the registered vehicle identification information is proceeded. If the comparison shows consistency, the sole identification code is transferred to the vehicle-mounted mainframe (120). The vehicle-mounted mainframe (120) writes the sole identification code into the first memory (123) to serve as a control identification code, thereby enabling operation of the vehicle-mounted mainframe (120).

It can be known from the above that in the vehicle anti-theft system and method of the invention, the sole identification code is utilized to tie the vehicle-mounted mainframe (120) and the at least a part (140) so as to avoid the situation of separating the at least a part (140) for selling as the vehicle (150) is stolen and disassembled, thereby lowering the probability of the vehicle (150) being stolen. Meanwhile, according to the invention, a part (140) can be newly added in the vehicle easily without the need of driving the vehicle to the field for maintenance, thereby increasing the convenience of the driver in usage.

The above embodiments are merely exampled to interpret the invention for the sake of convenience. What is claimed by the invention should be based on the containing of the claims but not limited to the embodiments disclosed above.

What is claimed is:

1. A vehicle anti-theft system, comprising:
   a customer service center, including a mainframe and a first transceiver device, in which the customer service center transfers a sole identification code through the mainframe and the first transceiver device via a radio channel;
   a vehicle-mounted mainframe, installed on a vehicle and having a second transceiver device and a first memory, in which the vehicle-mounted mainframe receives the sole identification code through the second transceiver device and stores the code into the first memory;
   a transmission bus, connected to the vehicle-mounted mainframe; and
   at least a part, having a second memory and connected to the transmission bus;
   wherein the vehicle-mounted mainframe transfers the sole identification code to the at least a part through the transmission bus and the at least a part stores the sole identification code into the second memory for subsequent inspection by the vehicle-mounted mainframe.

2. The vehicle anti-theft system as claimed in claim 1, wherein the second transceiver device is one of the following: a GSM transceiver device, a GPRS transceiver device, a WCDMA transceiver device, a CDMA 2000 transceiver device and a WiMax transceiver device.

3. The vehicle anti-theft system as claimed in claim 2, wherein the transmission bus is one of the following: a CAN interface bus, an LIN interface bus, an SPI interface bus and an I2C interface bus.

4. The vehicle anti-theft system as claimed in claim 3, wherein the at least a part is one of the following: a vehicle-controlled transmission system, a vehicle air conditioning system, a vehicle battery system, a vehicle meter panel system, a vehicle navigation system and a vehicle video and audio system.

5. The vehicle anti-theft system as claimed in claim 1, wherein the customer service center further comprises a vehicle identification database and a database for stolen events to be based for determining a stolen vehicle or a component.

6. The vehicle anti-theft system as claimed in claim 1, wherein the vehicle-mounted mainframe further comprises a GPS satellite positioning module.

7. A vehicle anti-theft method, in which a vehicle-mounted mainframe downloads from a customer service center a sole identification code, serving as a control identification code, and transfers and stores the sole identification code into at least a part as a part identification code, and the vehicle-mounted mainframe and the at least a part are installed in a vehicle and interconnected with other through a transmission bus, the method comprising the steps of:
   (A) the vehicle-mounted mainframe determining if the control identification code is obtained when the vehicle is activated;
   (B) sending a request command to the at least a part as the vehicle-mounted mainframe determines that the control identification code is obtained;
   (C) the at least a part determining if the format of the request command is correct;
   (D) the at least a part determining if a part identification code is provided thereon as the format of the request command is determined correct;
   (E) transmitting the part identification code to the vehicle-mounted mainframe as the at least a part determines that the part identification code is provided thereon;
   (F) the vehicle-mounted mainframe determining if the part identification code transmitted by the at least a part meets with the control identification code pre-stored in the vehicle-mounted mainframe; and
   (G) as the vehicle-mounted mainframe determines that the part identification code transmitted by the at least a part meets with the control identification code pre-stored in the vehicle-mounted mainframe, the vehicle-mounted mainframe entering into a normal operational mode and transmitting the identification code to the customer service center; if not, the vehicle-mounted mainframe producing an abnormal signal and transmitting the abnormal signal to the customer service center.

8. The vehicle anti-theft method as claimed in claim 7, further comprising the steps of:
   (H) after the vehicle-mounted mainframe enters into a normal operational mode and transmits the identification code to the customer service center, the customer service center verifying if a vehicle is stolen by checking a database for stolen events, and if not, ending the method; and (O) if the customer service center verifies that a vehicle is stolen by checking the database for stolen events, producing a signal of being stolen, and tracking the current running route of the vehicle and reporting to the police.

9. The vehicle anti-theft method as claimed in claim 8, further comprising the steps: of
(G') after the vehicle-mounted mainframe transmits the abnormal signal to the vehicle-mounted mainframe, transmitting the sole identification code of the at least a part to the customer service center;
(I) the customer service center determining if a part is stolen by checking the database for stolen events, and if yes, proceeding with step (O); and
(I') if step (I) determines that no part is stolen, producing an alarm signal according to the abnormal signal and the sole identification code of the at least a part.

10. The vehicle anti-theft method as claimed in claim 9, further comprising the steps of:
(J) if the at least a part determines in the step (D) that the part identification code is not provided thereon, transmitting a signal indicating no sole identification code to the vehicle-mounted mainframe;
(K) the vehicle-mounted mainframe transmitting and storing the sole identification code pre-stored thereon to the at least a part; and
(L) after completion of storing, the at least a part responding a signal indicating completion of storing, and a normal operation mode being entered.

11. The vehicle anti-theft method as claimed in claim 10, further comprising the step of:
(C') as the at least a part determines in the step (C) that the format of the request order is incorrect, the at least a part entering into an abnormal operation mode.

12. The vehicle anti-theft method as claimed in claim 11, further comprising the step of:
(M) as the vehicle-mounted mainframe determines in the step (A) not obtaining the sole identification code, the vehicle-mounted mainframe transmitting a download identification code signal to the customer service center and downloads the sole identification code from the customer service center.

13. The vehicle anti-theft method as claimed in claim 12, wherein the customer service center comprises a first transceiver device and the vehicle-mounted mainframe comprises a second transceiver device such that the customer service center uses the first transceiver device to communicate with the second transceiver device of the vehicle-mounted mainframe via a radio channel.

14. The vehicle anti-theft method as claimed in claim 13, wherein the second transceiver device is one of the following: a GSM transceiver device, a GPRS transceiver device, a WCDMA transceiver device, a CDMA 2000 transceiver device and a WiMax transceiver device.

15. The vehicle anti-theft method as claimed in claim 14, wherein the transmission bus is one of the following: a CAN interface bus, an LIN interface bus, an SPI interface bus and an I2C interface bus.

16. The vehicle anti-theft method as claimed in claim 15, wherein the at least a part is one of the following: a vehicle-controlled transmission system, a vehicle air conditioning system, a vehicle battery system, a vehicle meter panel system, a vehicle navigation system and a vehicle video and audio system.

* * * * *